(No Model.)

H. DICKSON.
PROCESS OF MAKING BRICK.

No. 346,361. Patented July 27, 1886.

2 Sheets—Sheet 1.

WITNESSES:
Fred. G. Dieterich.
Wm. W. S. Dyre.

INVENTOR.
Henry Dickson
By Johnston Reinohl & Dyre
ATTORNEYS.

(No Model.) 2 Sheets—Sheet 2.

H. DICKSON.
PROCESS OF MAKING BRICK.

No. 346,361. Patented July 27, 1886.

WITNESSES
Fred. G. Dieterich
Wm. W. L. Dyre.

INVENTOR
Henry Dickson
By Johnston, Reinohl & Dyre
Attorneys

UNITED STATES PATENT OFFICE.

HENRY DICKSON, OF PITTSBURG, PENNSYLVANIA, ASSIGNOR TO SUSAN CATHERINE DICKSON, OF SAME PLACE.

PROCESS OF MAKING BRICK.

SPECIFICATION forming part of Letters Patent No. 346,361, dated July 27, 1886.

Application filed May 6, 1885. Renewed June 18, 1886. Serial No. 205,594. (No model.)

*To all whom it may concern:*

Be it known that I, HENRY DICKSON, a citizen of the United States, residing at Pittsburg, in the county of Allegheny and State of Pennsylvania, have invented certain new and useful Improvements in Process of Making Brick; and I do hereby declare the following to be a full, clear, and exact description of the invention, such as will enable others skilled in the art to which it appertains to make and use the same.

Experience in the drying of freshly molded brick when formed from tempered clay has demonstrated that they require a peculiar kind of treatment for drying sufficiently to set in the kiln. To this end various devices have been employed—such as hot-air flues under the drying-floor, furnace-flues communicating with a stack or stacks, placing the brick upon pallets and said pallets upon racks, within a close building, and heated air forced into said building for the purpose of absorbing the moisture in the brick.

Exhaust-fans have been employed in combination with hot-air and furnace flues for the purpose of carrying off the expelled vapors.

The foregoing, and the open-air-drying process, the employment of pallets in open sheds, and the drying of brick upon trucks provided with steam-pipes, constitute all or nearly all the means employed for the drying of freshly-molded brick when formed from tempered clay.

The foregoing instrumentalities have failed to accomplish the end desired, for the reason that they require too much time and labor and result in the loss of brick by cracking, and are attended by heavy expense to the manufacturer.

My invention has for its object the speedy drying of brick freshly molded from tempered clay at diminished cost and without liability to waste by cracking in the drying process, and also utilizing all the heat employed for power and drying.

My invention consists in the process hereinafter described—to wit, heating an earthen floor with steam to dry freshly-molded brick, collecting the water of condensation from the steam-pipes beneath the earthen floor in a suitable vessel, utilizing a portion of the hot water of condensation to moisten and temper clay, and returning the remainder of the hot water to a steam-boiler.

Figure 1:
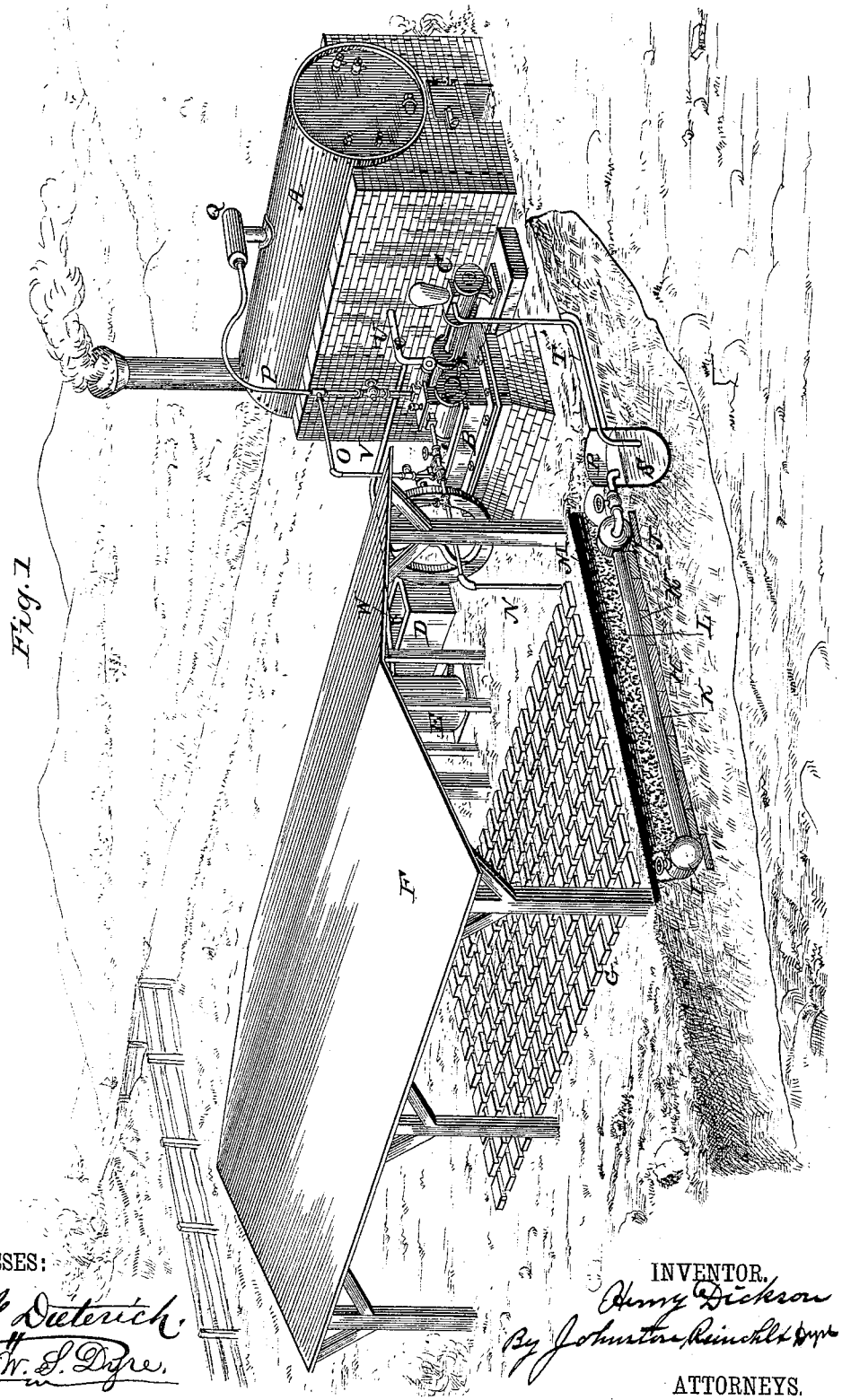
Figure 2:
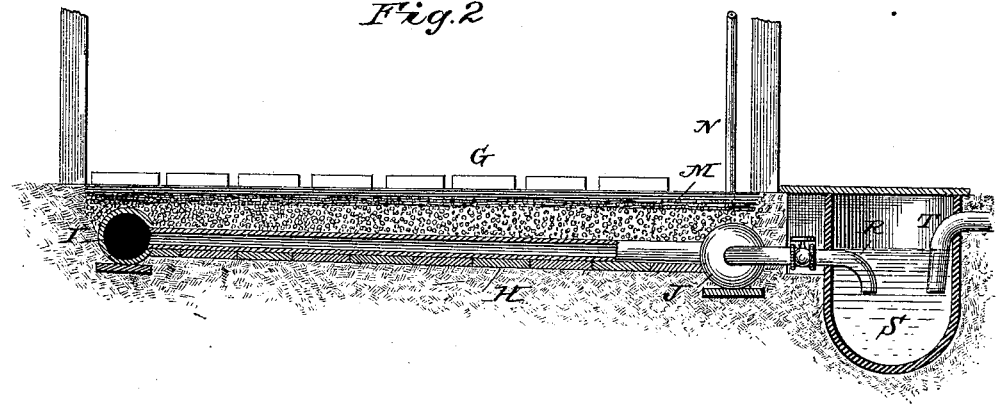
Figure 3:
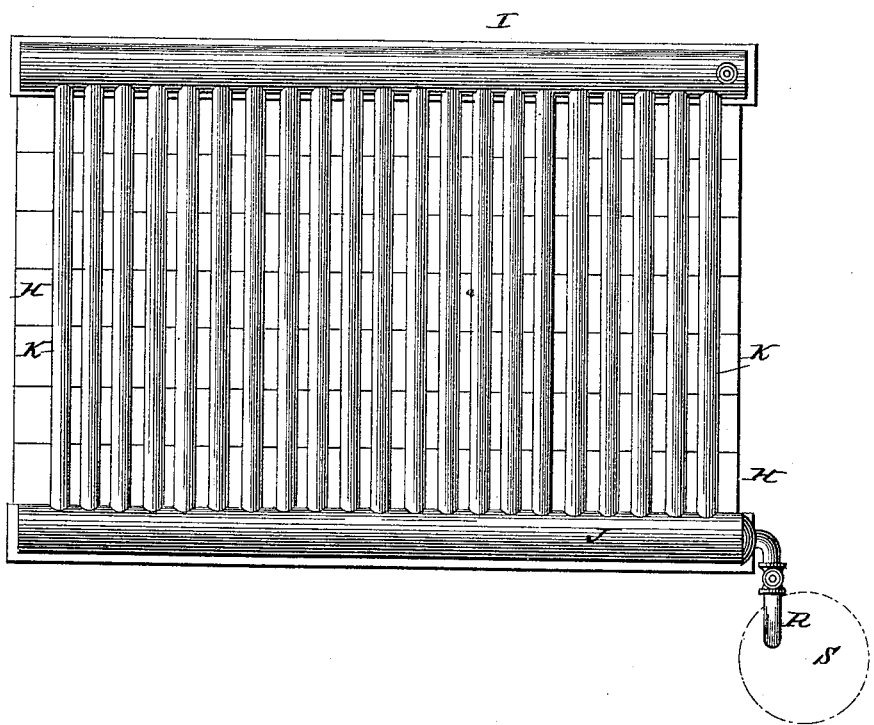

In the accompanying drawings, which form part of this specification, Figure 1 is a perspective view of a brick-yard provided with my improvement. Fig. 2 is a vertical and transverse section of the drying-floor and the vessel for receiving the product of condensation. Fig. 3 is a top view or plan of the heating-pipes arranged upon a foundation constructed of boards.

Reference being had to the drawings, A represents an ordinary steam-boiler, provided with the usual furnace and stack and the appendages common to steam-boilers.

B represents an ordinary steam-engine.

C represents an ordinary steam-pump for supplying the boiler and soaking-vat D and tempering-mill E with water.

F represents a shed covering the drying-floor G, which is constructed as follows: The earth being suitably excavated, a floor or foundation for the heater is constructed of boards H, properly embedded, which boards should not be less than one inch in thickness. Upon this floor is arranged, about on a horizontal plane, the heating device, which consists of two large pipes or manifolds, I J, connected by transverse pipes K, about one inch in diameter, which pipes from center to center should not be more than three inches apart. The pipes are covered with a layer of sharp sand, as indicated at L. Upon this layer of sharp sand an earthen floor, M, is constructed of tempered clay, which should be from about two to three inches thick, made smooth by means of a roller or other suitable device. The heater or manifold communicates with the exhaust of an engine through the medium of a pipe, N, which also communicates by means of a pipe, O, which communicates with the supply-pipe P, which communicates with the steam-drum Q of the boiler A. The manifold communicates, by means of a pipe, R, with a well or vessel, S, which receives the product of condensation from the steam-heating pipes. The well or vessel S communicates with the pump C through the medium of a pipe, T. The pump C communicates with the boiler A through the medium of a pipe, U, to which is attached a pipe, V, which communicates with the tempering-mill E and with the soaking-vat D by means of a branch pipe, W. The several pipes mentioned are provided with suitable valves for the purpose of regulating the flow of steam or water through them.

All of the parts being constructed substantially as described, their operation is as follows: Steam is generated in the boiler A, which is conducted to the engine B through the medium of pipe P, which communicates with the steam-drum Q. With the exhaust-port of the engine communicates a pipe, N, which communicates with the pipe J of the manifold heater under the earthen floor G. The exhaust-steam circulates through said heater, and the product of condensation flows into the well or vessel S through the medium of pipe R, which communicates with the manifold heater under the earthen floor G. The well S and steam-pump C communicate with each other through the medium of a pipe, T. The pump also communicates with the boiler A by means of a pipe, U, whereby the product of condensation is carried back into the boiler A, or the soaking-vat D, or tempering-mill E, through the pipe V and its branch W. By suitably adjusting the valves for regulating the flow through the several pipes, the boiler is supplied with hot water, the clay in the vat D soaked with hot water, and hot water supplied to the clay in the tempering-mill, whereby the clay as it comes from the tempering-mill to the brick-molder is in a heated condition. The freshly-molded brick are borne off and deposited upon the earthen floor G in the usual manner.

It will be observed that the brick being formed from clay in a heated condition and deposited upon the floor G in said state, several hours in time are saved which were formerly required for bringing the brick up in temperature to the point at which, by my process, they are deposited upon the floor.

The boards I serve a twofold purpose: First, they cut off communication between the floor G and the earth below the boards; second, they act as a non-conductor for preventing the absorption of the heat of the manifold by the earth upon which the drying-floor G is built. The strata of clean sharp sand L rapidly takes up the heat from the manifold and communicates it to the earthen floor G, which is very solid and compact, and absorbs very rapidly the moisture from the heated brick deposited thereon. The rapid absorption of the moisture of the brick by the heated floor, in conjunction with the heated condition of the brick when deposited upon said floor, causes them to dry faster and with less liability to crack than can be done by any process hitherto known to the art of brick-making.

Experience has demonstrated that in the molding and drying of brick by my process much labor is saved, for the clay is more plastic and more readily assumes the outline of the mold, and the labor of "upedging" and subsequent "hacking" is entirely dispensed with, and it does not require half the time usually consumed in drying, thereby enabling the brick-manufacturer to run without loss a double gang with the same floor, soaking-vat, and tempering-mill.

In other applications for Letters Patent of even date of filing I have claimed the process of preparing clay and making brick therefrom, as hereinbefore described, and the means employed for carrying out my invention.

Having thus fully described my invention, what I claim is—

1. In the art of making brick, the process herein described, which consists in heating an earthen floor by steam to dry freshly-molded brick, collecting the water of condensation from the steam-pipes beneath the earthen floor in a suitable vessel, and utilizing a portion of the hot water to moisten or soak and temper clay, substantially as described.

2. The process of making brick, which consists in generating steam in a boiler, conducting steam from the boiler to an engine to operate the machinery required, and the exhaust-steam from the engine into heating-pipes beneath an earthen drying-floor, collecting the product of condensation in a suitable vessel, conducting a portion thereof to a clay-soaking vat and tempering-mill, and returning the remainder of the water to the boiler, substantially as described.

In testimony whereof I affix my signature in presence of two witnesses.

HENRY DICKSON.

Witnesses:
JAMES J. JOHNSTON,
HENRY F. BRINTON.